Aug. 21, 1923.  1,465,660
F. G. ALBORN
BATTERY MOUNTING AND HOUSING
Filed June 5, 1919  4 Sheets-Sheet 1
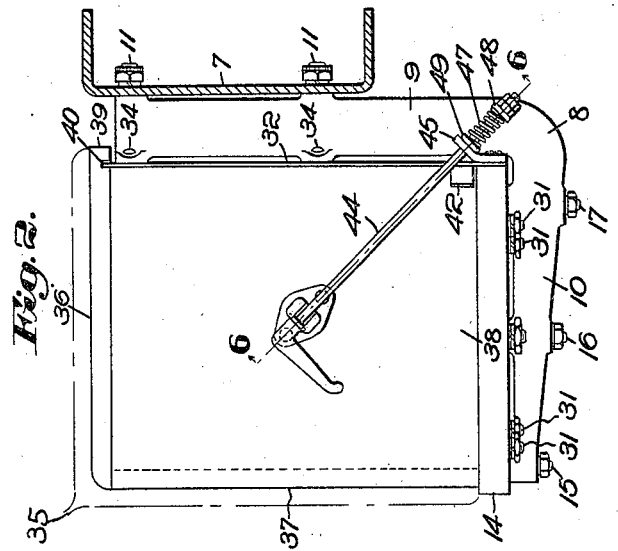
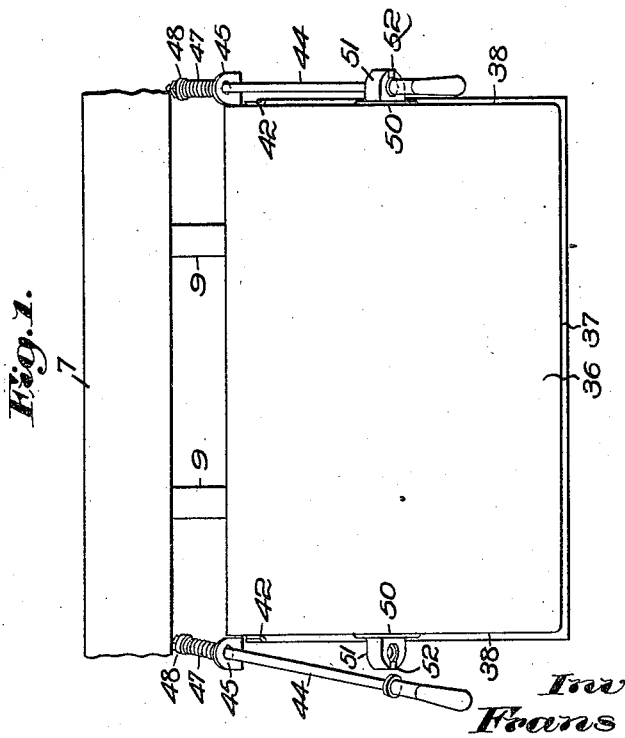
Inventor:
Frans G. Alborn
by Emery, Booth, Janney Varney
Attys.

Aug. 21, 1923. 1,465,660
F. G. ALBORN
BATTERY MOUNTING AND HOUSING
Filed June 5, 1919 4 Sheets-Sheet 2
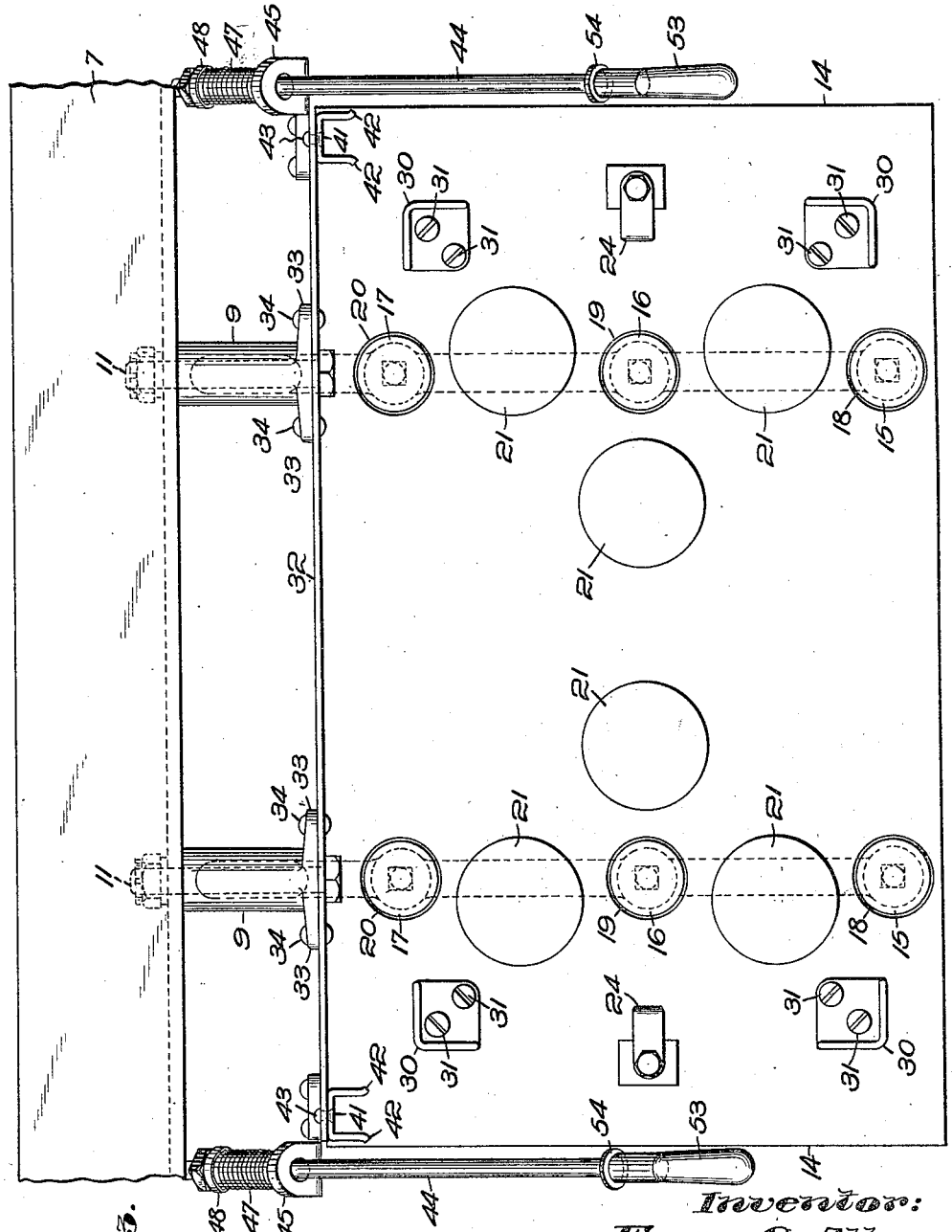

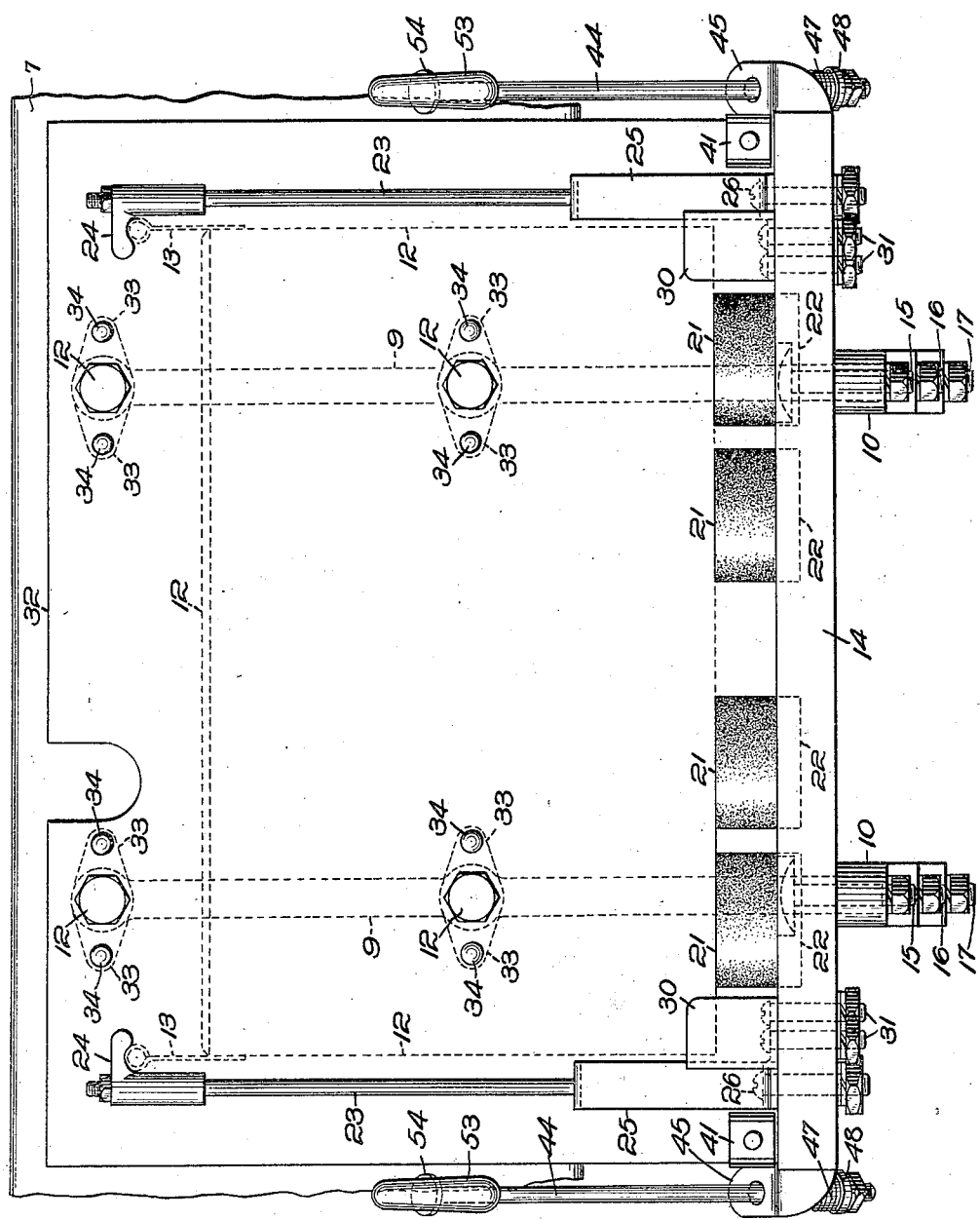

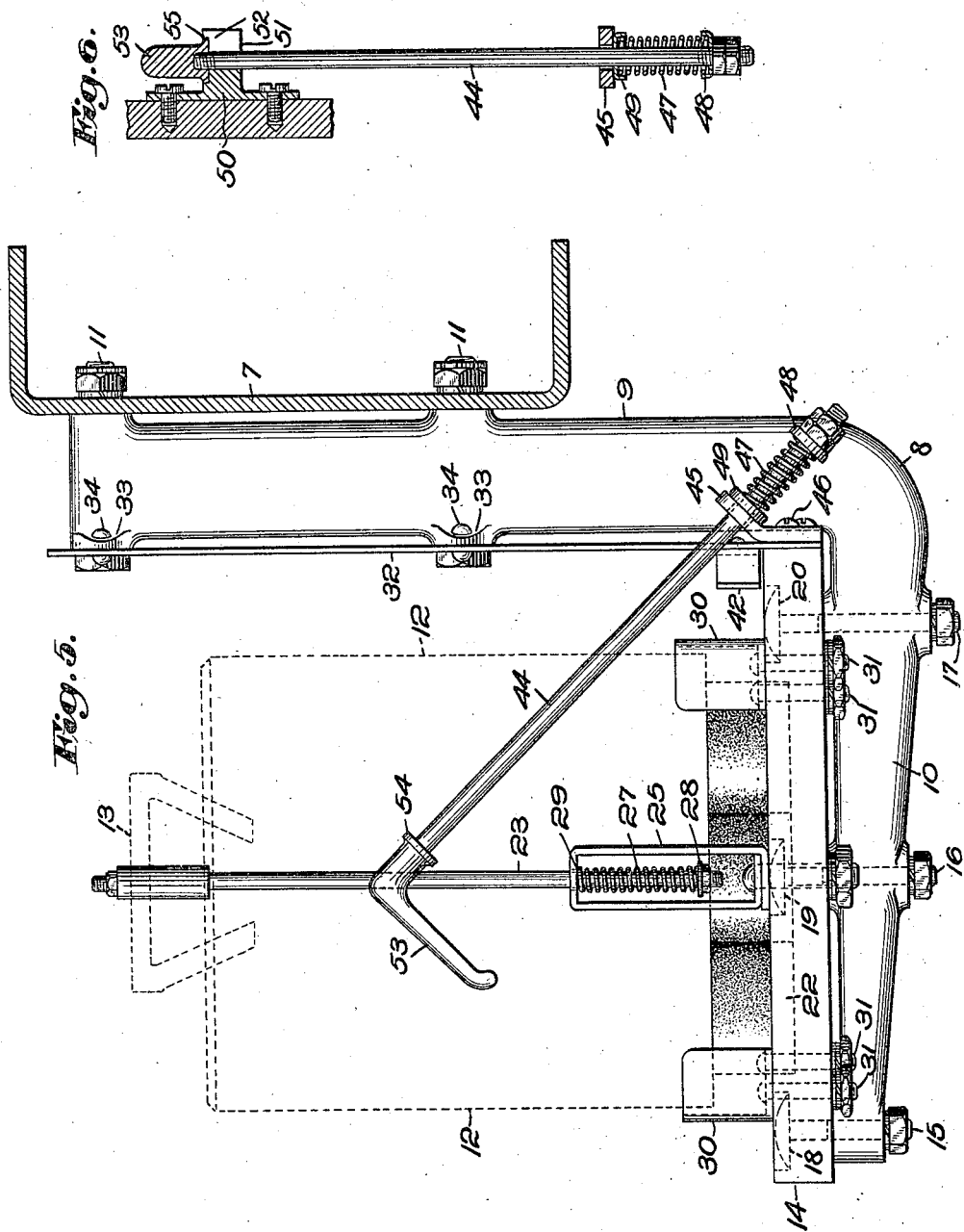

Patented Aug. 21, 1923.

1,465,660

UNITED STATES PATENT OFFICE.

FRANS G. ALBORN, OF MILFORD, CONNECTICUT, ASSIGNOR, BY MESNE ASSIGNMENTS, TO THE LOCOMOBILE COMPANY, OF BRIDGEPORT, CONNECTICUT, A CORPORATION OF DELAWARE.

BATTERY MOUNTING AND HOUSING.

Application filed June 5, 1919. Serial No. 301,904.

*To all whom it may concern:*

Be it known that I, FRANS G. ALBORN, a citizen of the United States, and a resident of Milford, New Haven County, Conn., have invented an Improvement in Battery Mountings and Housings, of which the following description, in connection with the accompanying drawings, is a specification, like characters on the drawings representing like parts.

This invention relates to mountings and housings for accessories, such as the batteries of motor vehicles, and aims to provide support and protection for the battery while still rendering the same conveniently accessible for inspection, repair and replacement.

My invention will be best understood by reference to the following description, when taken in connection with the accompanying drawings of one illustrative embodiment thereof, while its scope will be more particularly pointed out in the appended claims.

In the drawings:

Fig. 1 is a plan of a battery mounting and housing exemplifying my invention, one of the cover fasteners being shown detached from the cover.

Fig. 2 is an elevation viewed from the right-hand side of Fig. 1;

Fig. 3 is a plan of the mounting on an enlarged scale, as it appears with the cover removed;

Fig. 4 is a front elevation of the parts shown in Fig. 3;

Fig. 5 is a side elevation of the parts shown in Figs. 3 and 4; and

Fig. 6 is a sectional view on an enlarged scale on line 6—6 of Fig. 2.

Referring to the drawings, and to the embodiment of my invention which I have selected for exemplification, I have shown a battery mounting and housing mounted on a suitable support, which may be and herein is a channel bar 7, such as that which usually forms one of the longitudinal frame members of a motor vehicle. The mounting comprises one or more, herein a pair of suitable brackets 8, which, in the present example, have uprights 9 and horizontal arms 10. The uprights 9 are suitably secured, as by bolts 11, to the vertical web of the channel bar 7. The arms 10 provide a support for a storage battery 12, whose outline is indicated in dotted lines in Figs. 4 and 5, said battery having usual handles 13.

The battery is suitably supported on the arms 100 by the provision of a base, herein comprising a board 14, appropriately secured to the arms as by bolts 15, 16 and 17, whose heads are preferably sunk below the upper surface of the board by providing the latter with suitable depressions 18, 19 and 20.

As a means to cushion the battery, the latter in the present example is mounted on suitable cushioning means, herein comprising a plurality of rubber discs 21, seated in recesses 22 provided in the board 14. In the present embodiment, the battery is held in place on these cushions by spring clamping means, herein comprising a pair of vertically extensible devices, each including a rod 23 having at its upper end a suitably shaped clamp, herein an inwardly facing hook 24 engaging the top of the adjacent battery handle 13. The lower terminal portion of each rod 23 is herein mounted to slide vertically in an appropriate guide 25, suitably secured, as by a bolt 26, to the board 14. A helically-coiled spring 27, encircling the rod 23, bears at its upper end against an abutment 29 on the guide 25. Where the rod 23 passes through the abutment 29, a sufficient clearance is provided to allow the hooks 24 to be pulled in an upward direction, and then swung laterally away from the battery to permit the latter to be removed from its place. Proper positioning of the battery on its support is ensured by the provision of suitable positioning means, herein a set of brackets 30 having an L-shaped form, as viewed in plan (Fig. 3), the bases of said brackets being appropriately secured to the board 14, as by bolts 31.

The mounting herein provides the bottom or floor and one of the side walls of a battery housing. In the present example, the board 14 constitutes the bottom or the floor, while one side wall is provided by a plate 32, which is suitably secured to the uprights 9 of the brackets 8, as by providing the latter with lugs 33 to receive rivets 34 extending through the plate, as best shown in Fig. 3.

The top or roof and the remaining side walls of the housing are herein provided by a cover 35 having a top 36, a front wall 37 and two end walls 38, which depend from the top. The latter is herein extended to provide a margin 39 overhanging the upper edge of the wall 32, and preferably said margin is provided with a groove 40 to receive the upper edge of said wall, thereby to exclude water and other foreign matter. Rain will, of course, drip from the edge of the overhanging margin. The inner, lower corners of the end walls 38 are preferably braced and positioned by suitable means, herein a pair of U-shaped brackets 41 (best shown in Fig. 3), each having a pair of arms 42, whose extremities are preferably somewhat flared, as shown, to receive the end walls 38 of the cover. These brackets may be secured to the wall 32 by appropriate means, herein rivets 43.

As a means to secure the cover in place, and to ensure a snug fit against the bottom 14 and back wall 32, I have herein provided means having provision to urge said cover in a downward and lateral direction. In the present example, the cover holding means comprises a pair of tension members in the form of rods 44, best shown in Figs. 1 and 2, which are diagonally placed; that is to say, they are inclined to the bottom 14 and the wall 32, as shown in Fig. 2. In the present embodiment, these rods are equipped with resilient means, the effect of which is to hold the cover firmly, but with yielding pressure, against the bottom 14 and back wall 32. To this end, the support is herein provided with a pair of guides 45, in which the rods 44 are mounted to slide axially and are free to swing to a certain extent as illustrated at the left-hand side of Fig. 1. These guides are herein in the form of brackets secured to the wall 32, as by rivets 46. Helically-coiled springs 47, encircling the rods 44, bear at their lower ends against abutments 48, carried by said rods, while their upper ends bear against abutments 49 seated against the guides 45.

The upper ends of the rods are provided with suitable readily attachable and detachable means of attachment to the cover, the latter to this end being provided with brackets 50 having laterally-projecting lugs 51 slotted at 52 to receive the rods. The lugs 51 provide seats for handles 53 having abutments, herein in the form of bosses 54, and in order to prevent accidental lateral displacement of the rods, the lugs 51 are herein counterbored to provide recesses 55, in which the bosses 54 are seated. Thus the handles 53 are normally interlocked with the brackets 50, and cannot become detached therefrom, except by upward and outward movement in opposition to the springs 47. When the handles are thus freed, they are swung laterally to carry the rods 44 out of the slots 52, whereupon the cover may be removed.

Having thus described one embodiment of my invention, but without limiting myself thereto, what I claim and desire by Letters Patent to secure is:

1. A housing of the class described, comprising, in combination, a support providing a bottom and a wall upstanding therefrom presenting abutments, a cover providing a top and a plurality of walls depending therefrom seated against said abutments, and cover-holding means inclined to said bottom and upstanding wall and urging said cover in one direction against one abutment and in another direction against another abutment.

2. A housing of the class described, comprising, in combination, a support providing a bottom and a wall upstanding therefrom, a cover providing a top and a plurality of walls depending therefrom, and cover-holding means including diagonal rods connecting said support and said cover and disposed obliquely with reference to said upstanding wall and to said bottom.

3. A housing of the class described, comprising, in combination, a support providing a bottom and a wall upstanding therefrom, a cover providing a top and a plurality of walls depending therefrom, and cover-holding means including diagonal rods mounted on said support disposed obliquely with reference to said upstanding wall and to said bottom, and having readily attachable and detachable means of attachment to said cover.

4. The combination with a suitable support, of a plurality of brackets having uprights secured to said support and horizontal arms projecting laterally therefrom, a wall secured to said uprights, a floor secured to said arms, and a cover comprising a roof and three walls forming with the first-mentioned wall and said floor a housing.

5. The combination with a support having a generally vertical surface, of a generally L-shaped bracket having uprights secured to said support against said vertical surface and having arms projecting laterally therefrom, and a cover supported on said bracket and having a top and a plurality of walls depending therefrom.

In testimony whereof, I have signed my name to this specification.

FRANS G. ALBORN.